(12) United States Patent
Deng et al.

(10) Patent No.: US 10,169,173 B2
(45) Date of Patent: *Jan. 1, 2019

(54) PRESERVING MANAGEMENT SERVICES WITH DISTRIBUTED METADATA THROUGH THE DISASTER RECOVERY LIFE CYCLE

(71) Applicant: International Business Machines Corporation, Armonk, NY (US)

(72) Inventors: Yu Deng, Yorktown Heights, NY (US); Ruchi Mahindru, Elmsford, NY (US); HariGovind V. Ramasamy, Ossining, NY (US); Soumitra Sarkar, Cary, NC (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,312

(22) Filed: Nov. 21, 2015

(65) Prior Publication Data

US 2016/0239396 A1    Aug. 18, 2016

Related U.S. Application Data

(63) Continuation of application No. 14/623,013, filed on Feb. 16, 2015.

(51) Int. Cl.
*G06F 11/00* (2006.01)
*G06F 11/20* (2006.01)
(Continued)

(52) U.S. Cl.
CPC ...... *G06F 11/2007* (2013.01); *G06F 11/1458* (2013.01); *G06F 11/1662* (2013.01);
(Continued)

(58) Field of Classification Search
CPC .................................................. G06F 11/2007
See application file for complete search history.

(56) References Cited

U.S. PATENT DOCUMENTS 6,163,856 A    12/2000  Dion et al.
7,275,177 B2    9/2007  Armangau et al.
(Continued)

FOREIGN PATENT DOCUMENTS

WO    WO2007008296    1/2007

OTHER PUBLICATIONS

Peter Mell & Tim Grance, "The NIST Definition of Cloud Computing", Version 15, Oct. 7, 2009, Computer Security Division Technology Laboratory, National Institute of Standards and Technology, Sep. 2011, pp. 1-2.

(Continued)

*Primary Examiner* — Bryce P Bonzo
*Assistant Examiner* — Katherine Lin
(74) *Attorney, Agent, or Firm* — Kurt Goudy; Otterstedt, Ellenbogen & Kammer, LLP

(57) ABSTRACT

For disaster recovery involving a first site and a disaster recovery site, where at least a portion of management service metadata not isolated within the management service, a failover process is initiated, including creating an initial snapshot of the distributed metadata state. In a failback process, a representation is created of state changes for the management service and a delta description is calculated therefrom. The delta description is transmitted to the first site; and a reverse replica is created, at the first site, of all the workload components from the disaster recovery site. The delta description is played back to restore a distributed metadata state that existed in the disaster recovery site and to re-create it in the first site.

12 Claims, 13 Drawing Sheets

(51) Int. Cl.
*G06F 11/14* (2006.01)
*G06F 11/16* (2006.01)

(52) U.S. Cl.
CPC ...... *G06F 11/1666* (2013.01); *G06F 11/2069* (2013.01); *G06F 2201/805* (2013.01); *G06F 2201/84* (2013.01); *G06F 2201/85* (2013.01)

(56) References Cited

U.S. PATENT DOCUMENTS

| | | | |
|---|---|---|---|
| 7,373,468 | B1 | 5/2008 | Gupta |
| 7,600,146 | B2 * | 10/2009 | Liccione ............ G06F 11/2023 714/15 |
| 8,276,016 | B2 | 9/2012 | D'Souza et al. |
| 8,775,394 | B2 | 7/2014 | Smoot et al. |
| 8,990,153 | B2 * | 3/2015 | Wayda ................ G06F 3/0607 707/610 |
| 9,305,010 | B1 * | 4/2016 | Faibish ............ G06F 17/30174 |
| 9,417,976 | B2 | 8/2016 | Sugabrahmam et al. |
| 2007/0185934 | A1 | 8/2007 | Cannon |
| 2007/0234342 | A1 | 10/2007 | Flynn |
| 2008/0080497 | A1 | 4/2008 | Meijer |
| 2011/0047548 | A1 | 2/2011 | Traut |
| 2011/0178983 | A1 | 7/2011 | Bernhard et al. |
| 2012/0203742 | A1 | 8/2012 | Goodman et al. |
| 2012/0284707 | A1 | 11/2012 | Janakiraman |
| 2014/0040206 | A1 | 2/2014 | Ramakrishnan et al. |
| 2014/0040658 | A1 | 2/2014 | Adler et al. |
| 2014/0372378 | A1 | 12/2014 | Long et al. |
| 2015/0195178 | A1 * | 7/2015 | Bhattacharya ........ H04L 45/745 718/1 |
| 2015/0317222 | A1 * | 11/2015 | Mahindru ........... G06F 11/2023 714/4.11 |
| 2016/0004603 | A1 | 1/2016 | Lakshman et al. |
| 2016/0062858 | A1 * | 3/2016 | Gallagher ........... G06F 11/1484 714/6.23 |

OTHER PUBLICATIONS

Prasad Calyam, Phani Kumar Arava, Nathan Howes, Siddharth Samsi, Chris Butler, Jeff Jones, "Network Tuning and Monitoring for Disaster Recovery Data Backup and Retrieval", OSC Technical Whitepaper, 2005 pp. 1-9.

Yu Deng et al, Unpublished U.S. Appl. No. 14/623,013, filed Feb. 16, 2015, Preserving Management Services With Distributed Metadata Through the Disaster Recovery Life Cycle, pp. 1-46 plus 13 sheets drawings.

List of IBM Patents or Patent Applications Treated as Related.

* cited by examiner

802 RUN EVENT-POLICY MAPPER CONFIGURATION FIXUP SCRIPT

•COMMON SCRIPT ASSUMPTION APPLY
•ASSUMPTION NO "WIRING" OF EVENT-POLICY MAPPER TO ANY OTHER MS INSTANCE (E.G., TICKETING)

804 THE EVENT DB ENTRIES WILL CONTAIN OLD IDENTITIES OF EVENT SOURCES (E.G., VMS)
 •SIMPLEST "FIXUP" APPROACH IS TO REMOVE ALL EVENT ENTRIES WITH SUCH OLD IDENTITIES
 •MORE COMPLEX "FIXUP" APPROACH IS TO UPDATE EACH EVENT DB ENTRY TO REPLACE OLD IDENTITY (HOST NAME AND/OR IP ADDRESS) WITH NEW IDENTITY

*FIG. 8*

Monitoring Metadata 1002 (one entry per server-agent combination in primary site)

| Server ID (IP address) | Agent ID | Per metric rule to determine if an event should be generated based on the metrics reported by the agent on that end point, and the severity of the event |
|---|---|---|

1. Event Management Metadata 1004 (one entry per server in primary site)

| Server ID (IP address) | Customer ID |
|---|---|

2. Event Management Metadata2 1006 (one entry per customer-event-severity in primary site)

| Customer ID | Event ID | Event severity | Ticket severity, ticket handler pool, ticketing system, etc. |
|---|---|---|---|

Post-DR fix-up of Monitoring metadata:

For each Server replica running in DR site { // assuming all monitored entities & agents in primary server restarted in replica)
   Select all monitoring metadata entries from primary site's Monitoring server replica
   Update IP address to that of the replica // this is fetched from DR Failover Manager metadata (prior art)
   Add to Monitoring metadata of DR site's Monitoring server
} ⎬ 1008

Post-DR fixup of Event Management metadata 1004:

For each Server replica running in DR site {
   Select Server-Customer ID mapping entry from primary site's Policy server replica
   Update IP address to that of the replica
   Add to Event Management metadata of DR site's Policy server
} ⎬ 1010

*FIG. 10*

| Delta Description (Final – Initial resource state of primary VM replica) | Provisioning operation(s) on primary VM during failback | Comments |
| --- | --- | --- |
| Memory added/removed | Add/delete memory to/from primary VM | |
| CPU(s) added/deleted | Add/delete CPU(s) to/from primary VM | |
| IP address(es) added/deleted | Add/delete IP address(es) to/from primary VM | |
| Disk added/removed | Add/remove disk to/from primary VM | • For each disk added in DR site, create new disk in primary VM and replicate primary VM disk contents from DR site LU. DR site file system changes will be reflected in reverse replica of volume to primary site.<br>• For each disk deleted in DR site, delete disk in pry. VM. Mount point changes will be recorded in the boot volume replica. |
| Disk size increased | Increase disk size | This will involve a workflow, e.g.: 1.increase disk size in pry. VM, 2. reverse replicate disk content from DR site. DR site FS changes will be reflected in reverse replica of volume to pry. |
| Security zone added/deleted | Add/delete security zone | Results in underlying firewall and VLAN changes. |

*FIG. 13*

PRESERVING MANAGEMENT SERVICES WITH DISTRIBUTED METADATA THROUGH THE DISASTER RECOVERY LIFE CYCLE

CROSS-REFERENCE TO RELATED APPLICATIONS

This application is a continuation of U.S. patent application Ser. No. 14/623,013 filed Feb. 16, 2015, the complete disclosure of which is expressly incorporated herein by reference in its entirety for all purposes.

STATEMENT OF GOVERNMENT RIGHTS

Not Applicable.

FIELD OF THE INVENTION

The present invention relates to the electrical, electronic and computer arts, and, more particularly, to information technology and the like.

BACKGROUND OF THE INVENTION

Disaster recovery (DR) refers to the preparation for recovery or continuation of vital information technology infrastructure after a disaster. Current disaster recovery techniques primarily address state maintenance of servers, and storage for servers and applications.

SUMMARY OF THE INVENTION

Principles of the invention provide techniques for preserving management services with distributed metadata through the disaster recovery life cycle. In one aspect, an exemplary method includes the step of during normal operation, at a first site, of a disaster recovery management unit including at least one customer workload machine and at least one management service machine implementing at least one management service, replicating to a remote disaster recovery site the at least one customer workload machine, the at least one management service machine, and metadata for the at least one management service. At least a portion of the metadata is not isolated within the at least one management service. A further step includes, after a disaster at the first site, initiating a failover process. The failover process in turn includes bringing up, at the remote disaster recovery site, a replicated version of the at least one customer workload machine; Bringing up, at the remote disaster recovery site, a replicated version of the at least one management service machine; operating, at the remote disaster recovery site, the replicated version of the at least one customer workload machine and the replicated version of the at least one management service machine, in accordance with the metadata for the at least one management service; and creating an initial snapshot of a distributed metadata state of the metadata for the at least one management service implemented on the replicated version of the at least one management service machine. A still further step includes, subsequent to initiating the failover process, initiating a failback process. The failback process includes creating a representation of state changes for the at least one management service implemented on the replicated version of the at least one management service machine made in the remote disaster recovery site since the failover process and calculating therefrom a delta description from the initial snapshot; transmitting the delta description to the first site; and creating a reverse replica of all the workload components from the remote disaster recovery site at the first site and playing back the delta description to restore a distributed metadata state that existed in the remote disaster recovery site and re-create it in the first site.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. One example of a managed service with distributed metadata that can continue to be supported after a disaster, and also after recovery, is virtual resource provisioning in a Cloud. Such support will allow normal operations in a Cloud to continue seamlessly after a disaster rather than constrained operations (with no provisioning allowed), which is typical of how systems are run after a disaster, with the expectation that normal operations will be resumed soon.

These and other features and advantages of the present invention will become apparent from the following detailed description of illustrative embodiments thereof, which is to be read in connection with the accompanying drawings.

BRIEF DESCRIPTION OF THE DRAWINGS

FIG. 8 is a detailed flow chart of one possible manner of carrying out step 610 in FIG. 6, useful with self-contained metadata;

FIG. 10 shows exemplary meta-data for a monitoring example, useful with self-contained metadata;

FIG. 13 presents a table of delta descriptions and execution steps in a primary site failback manager upon failback, in accordance with an aspect of the invention.

DETAILED DESCRIPTION OF PREFERRED EMBODIMENTS

Figure 1:
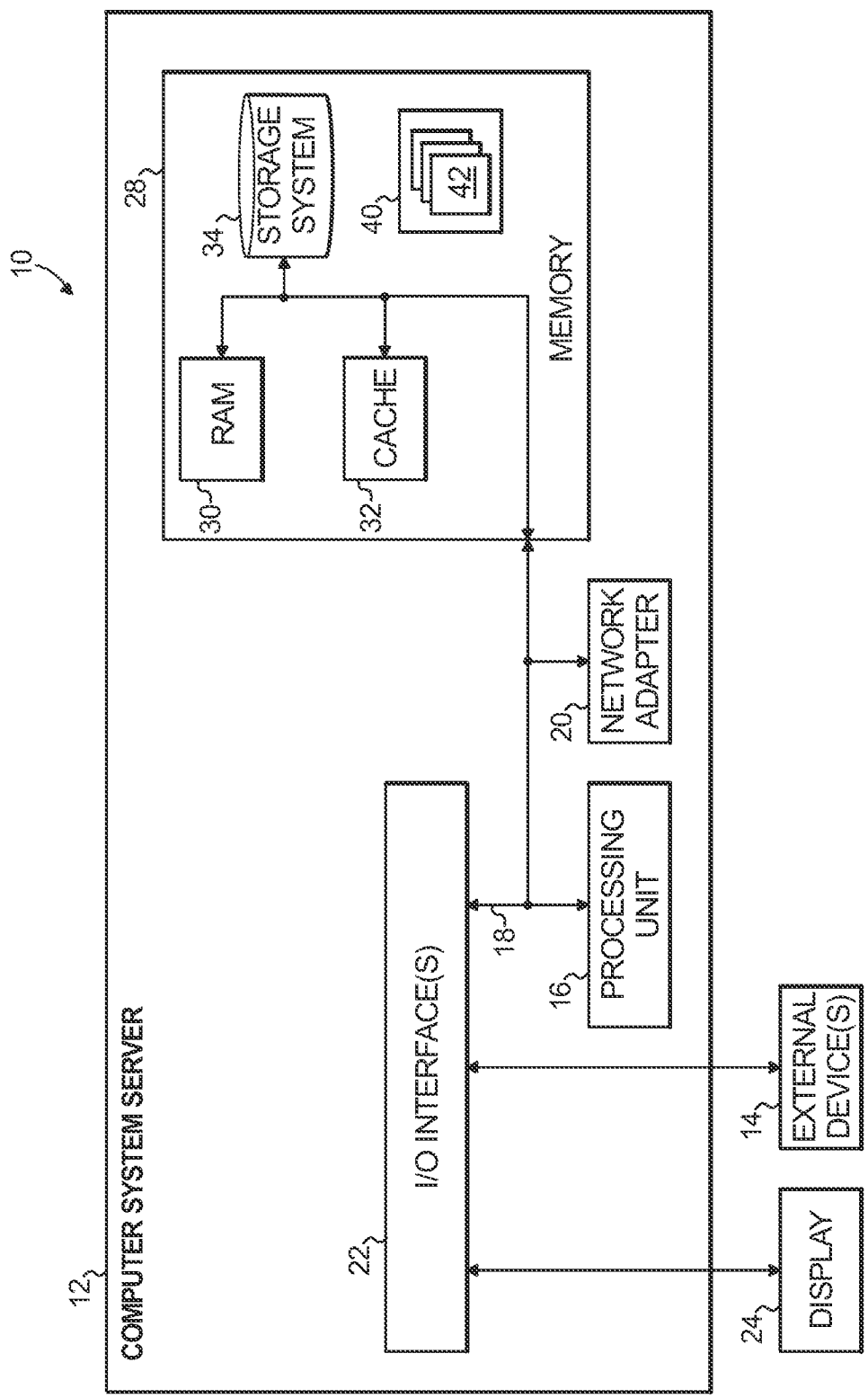
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
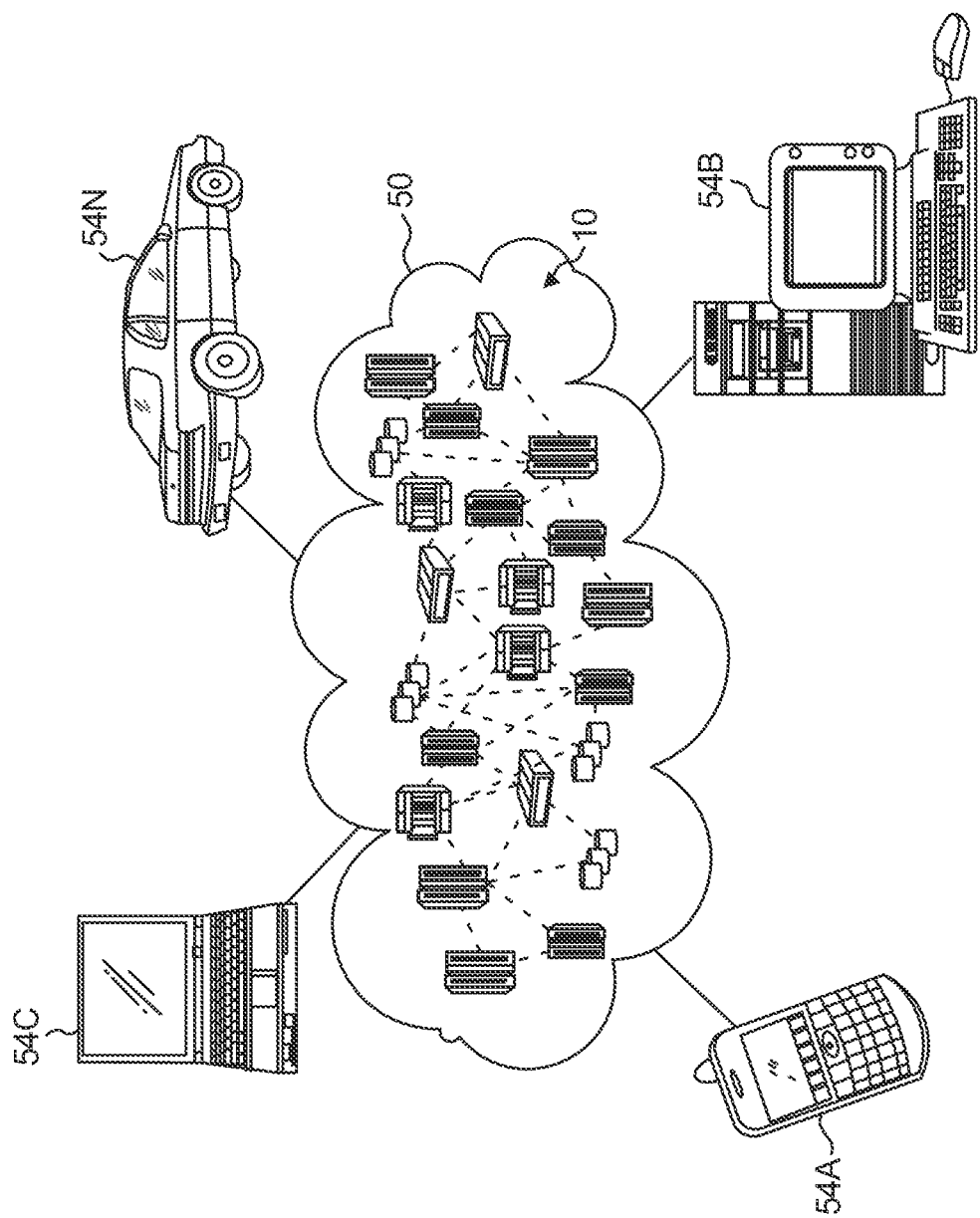
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
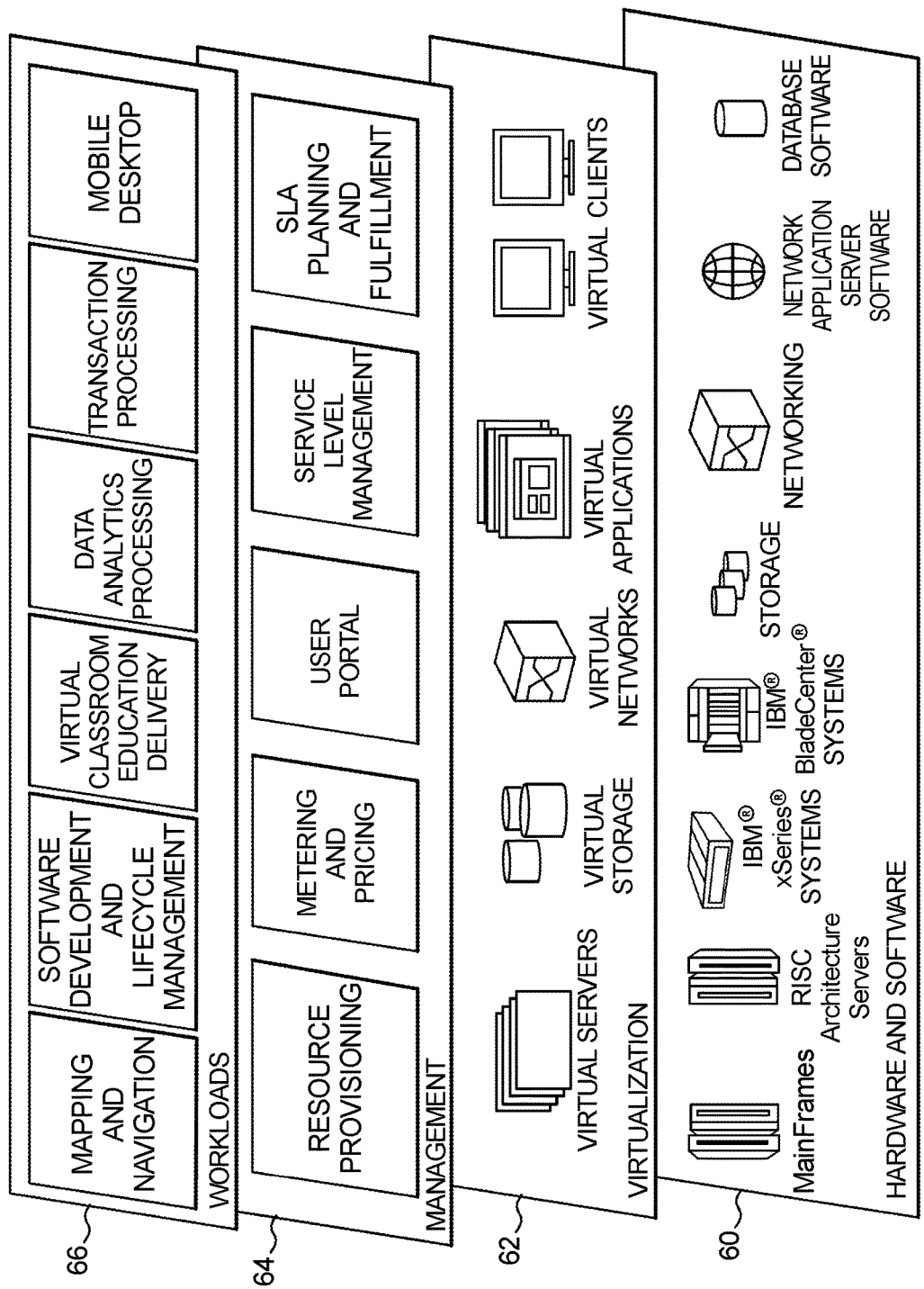
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, disaster recovery (DR) refers to the preparation for recovery or continuation of vital information technology infrastructure and applications after a disaster. Current disaster recovery techniques primarily address state maintenance of servers and storage for servers and applications.

Advantageously, one or more embodiments provide an approach to preserve monitoring and event management services for failed-over systems in the recovery site after a disaster. One or more embodiments apply to managed services whose meta-data that is impacted by the DR failover/failback process is distributed. However, to facilitate the disclosure of one or more embodiments, a description will first be provided of embodiments that apply to managed services whose meta-data that is impacted by the DR failover/failback process is contained within the managed service itself (self-contained).

One or more embodiments are generally applicable to management services with distributed metadata. A non-limiting example is provided in the context of Virtual Machine provisioning (of a management service with distributed metadata)—which is a Cloud Computing example. However, one or more embodiments can also be applied to Physical Machine provisioning also in a data center. Furthermore, another non-limiting example of management services with distributed metadata is so-called High Availability (HA), where the approach outlined in this application can also be applied with suitable customizations.

Self-Contained Metadata

In some cases, each management service maintains meta-data including that required for multi-tenancy support. This meta-data, in some embodiments, has to be replicated with a higher recovery point objective (RPO) (no-loss), and, after the DR, the meta-data has to be fixed up based on the state of the recovered virtual machines (VMs).

One or more embodiments are applicable to disaster recovery in both cloud environments and traditional (non-virtualized) data centers, including those with multi-tenancy such as hosting services.

Thus, when managed services are employed in an IT environment, the management layer 64 needs to be failed over to the disaster recovery site in the event of an outage. Monitoring is one non-limiting example of a management layer function. Typically, each of the managed services maintains some metadata, such as endpoints, customer virtual machines (VMs), and so on. In the case of event management, the metadata will be the policies that specify what is to be done upon the occurrence of certain events. In one or more embodiments, this metadata is failed over and fixed up (also referred to herein as "reconfigured") in the recovered VM(s) in the disaster recovery site.

As noted, current disaster recovery techniques primarily cover state maintenance of servers and applications such as storage for servers and applications. From a cloud perspective, these servers and applications are typically managed entities. Advantageously, one or more embodiments extend DR to the state maintenance of the managing entities. Some embodiments reuse some existing techniques such as storage replication that are used for the managed entities; however, these existing techniques are modified in one or more embodiments to provide additional pre-failover configuration and post-failover processing.

Again, it is to be emphasized that monitoring and/or event management are non-limiting exemplary applications; patching, identity management, asset management, and discovery processing are other non-limiting examples. In a cloud environment, as noted, there is a management layer 64 where there are tools running to manage the cloud: monitoring, patching, identity management, asset management, and so on. When a disaster occurs, there is a transition from the site where the disaster has occurred to the disaster recovery site; as part of this process, management layer 64 is failed over to the disaster recovery (failover) site. Failover of VMs, file structures, and the like are known from prior art. As noted, each of the management services typically maintains some metadata. Again, in the example of monitoring, metadata includes VMs, infrastructure layer, and the tools in the management stack; in the example of event management, metadata includes policies setting forth what needs to be done when an event comes in for a specific customer. An example of this includes automation policies per customer—certain automated remediation actions are taken if something happens on the customer's VM; e.g., a file system problem. Another example of meta-data includes the severity, threshold, sampling interval, and persistence that should be used to raise an alert for a customer VM. Another example of meta-data includes automation policies per customer that should determine how and where the event should be ticketed and routed.

Typically, data must be failed over and fixed up in the recovered VM in the failover site.

It is important to note that one or more embodiments are directed to failover for the items that manage the customer's workload as opposed to the customer's workload per se.

Figure 4:
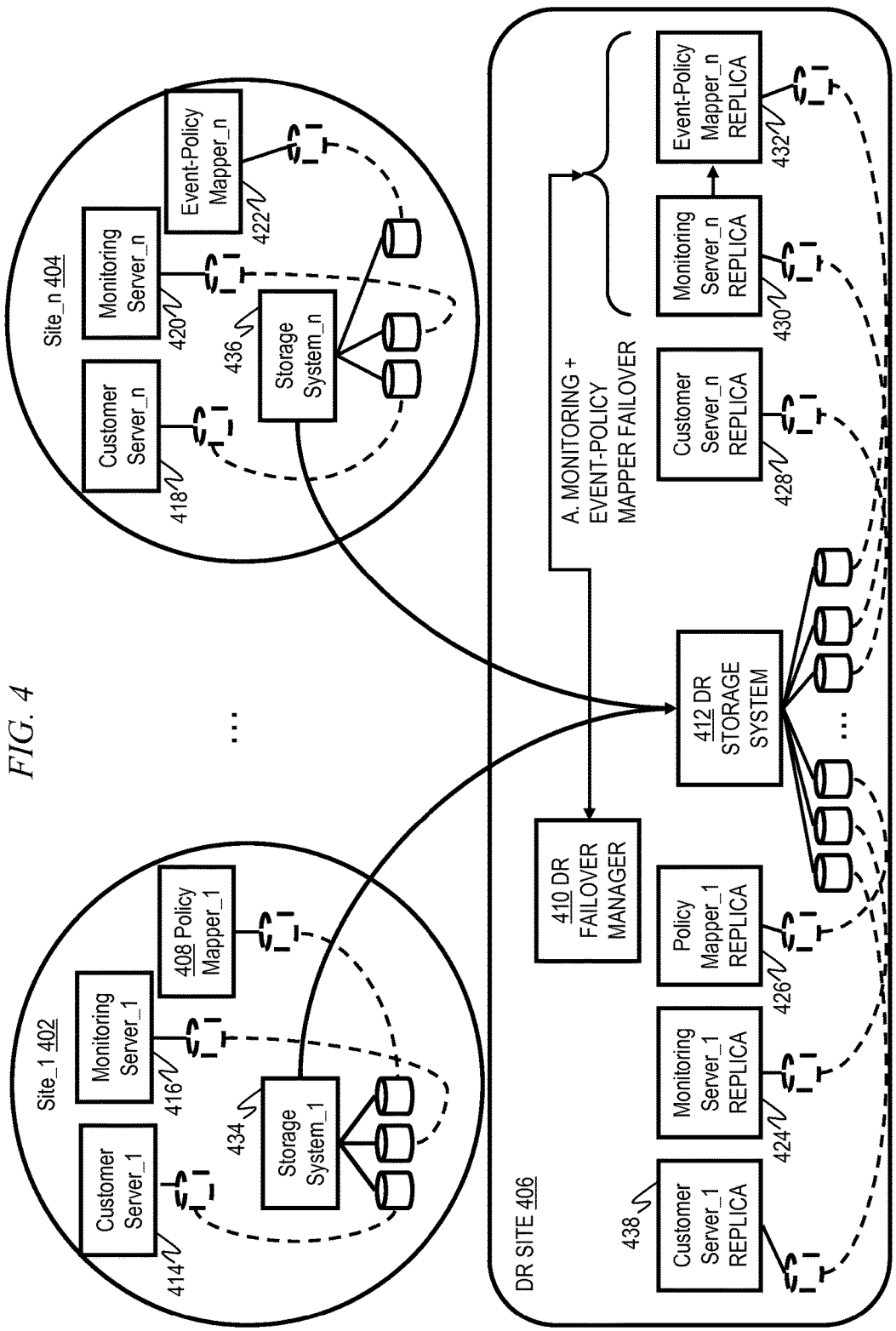
FIG. 4 depicts failover in a disaster recovery system with a monitoring scenario and asynchronous storage replication, useful with self-contained metadata.

Attention should now be given to FIG. 4, which depicts failover in a disaster recovery system with a monitoring scenario and asynchronous storage replication. Note two sites 402, 404 where customer workloads are running—these can be cloud or non-cloud sites, and there can be any number of sites, as indicated by the ellipsis. Replicas reside at disaster recovery (DR) site 406.

More particularly, first site 402, also designated as Site_1, includes Customer Server_1, designated as 414, Monitoring Server_1, designated as 416, and Policy Mapper_1, designated as 408, all coupled to Storage System_1, designated as 434. Furthermore, $n^{th}$ site 404, also designated as Site_n, includes Customer Server_n, designated as 418, Monitoring Server_n, designated as 420, and Event-Policy Mapper_n, designated as 422, all coupled to Storage System_n, designated as 436. Disaster recovery (DR) site 406 includes Customer Server_1 replica, designated as 438, Monitoring Server_1 replica, designated as 422, and Policy Mapper_1, designated as 426, all coupled to the DR storage system, designated as 412. Furthermore, DR site 406 further includes Customer Server_n replica, designated as 428, Monitoring Server_n replica, designated as 430, and Event-Policy Mapper_n replica, designated as 432, also all coupled to the DR storage system 412. Finally, DR site 406 includes DR failover manager 410 which orchestrates the failover process; the failover process includes not only conventional failover of the workloads but also of the monitoring servers 416, 420 and the policy mappers 408, 422.

Note that in general, a "PoD" (point of deployment) is a unit of management, and a site 402, 404 can, in general, include one or more PoDs. In order to be a management unit for disaster recovery purposes, there should be a centralized repository of MS (monitoring server) instances and topology. One or more embodiments employ per-MS configuration fix-up scripts for failover and failback, and make use of MS APIs (application program interfaces).

In FIG. 4, the asynchronous storage system replication is indicated by the bold curved arrows from the storage systems 434, 436 to the DR storage system 412. Software based replication also applies to one or more embodiments.

In normal operation, the customer servers 414, 418 (which, in general, can be real or virtual, although of course even virtual servers ultimately reside on one or more real machines) run one or more customer workloads. The monitoring servers 416, 420 monitor those workloads and detect events. The policy mappers 408, 422 work closely with the monitoring servers 416, 420 to initiate action in response to the events detected by the servers 416, 420 according to the corresponding mapping between events and policies. Each of the servers and mappers in the sites 402, 404 is asynchronously (not real time) replicated in the DR site 406.

When a disaster occurs (e.g., power outage), the workload and at least a subset of the servers are brought up at DR site 406. The customer servers can be brought up one-by-one by using the replicated volume. However, while, say, a server is now "up" to handle the workload, it is not being monitored; alerts are not being generated. In one or more embodiments, to address bringing up the managed service(s), monitoring servers and policy mappers have also been replicated, as seen at 424, 426, 430, 432 and eventually are brought up as well. However, endpoint addresses have changed—therefore, the replicas can't immediately monitor the replicated servers in the DR site 406; a fix-up is needed so that they can monitor the replicated servers in the DR environment. One or more embodiments employ metadata to facilitate the fix-up process.

Figure 5:
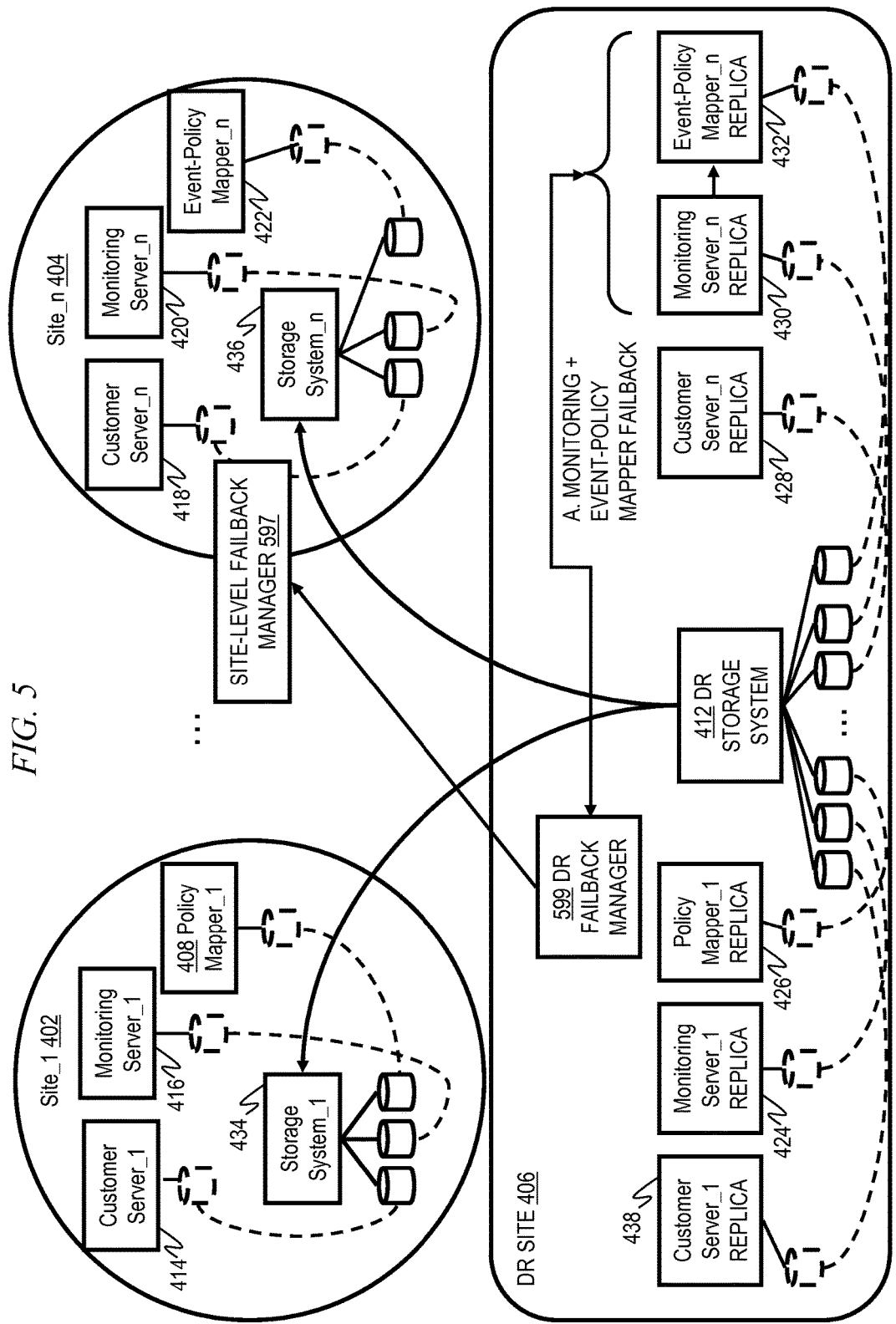
FIG. 5 depicts failback in a disaster recovery system with a monitoring scenario and asynchronous storage replication, useful with self-contained metadata.

FIG. 5 depicts failback in the disaster recovery system with monitoring scenario and asynchronous storage replication of FIG. 4. When the main site (here, Site_n 404) comes back up, begin background replication as indicated by the bold arrows from DR storage system 412 to storage systems 434, 436. For the avoidance of doubt, FIG. 5 depicts a condition wherein only Site_n is shown as being down. When this replication is complete, the reverse of the process described with regard to FIG. 4 is carried out, including for the monitoring servers and event policy mappers. Using site-level failback manager 597 and DR failback manager 599, start the machines at site 404, and eventually shut off the machines in DR site 406. Again, endpoint addresses have changed back to original—therefore, the reconstituted servers 420, 422 can't immediately monitor the reconstituted server 418 in the site 404; a fix-up is needed so that they can monitor the reconstituted server(s) in the site 404. One or more embodiments employ metadata to facilitate this fix-up process, as well.

It will be appreciated that at least some managed services run (as one or more VMs) independently of customer VMs, and that metadata and/or state is local to the managed service. In one or more embodiments, operations to enable failover after PoD failure and failback once the PoD is again operational are as follows:

Steady state: Continuous (optionally asynchronous) replication of state of PoD-MS 420 to DR site Failover: Extraction of state from MS replica 430, and subset+merge with DR-MS instance 430

Failback: Optionally merge the state of DR-MS instance 430 with PoD-MS state 420 in replica of site 404

As noted, one or more embodiments use metadata to facilitate management services after disaster recovery. One simple example is in the case of a firewall. The metadata includes the rules in the firewall policy file. These rules become invalid when the firewall is moved to the DR site 406, because there are new IP addresses. A simple map of the IP addresses associated with site 404 to those associated with DR site 406 can be used for the fix-up.

Figure 6:
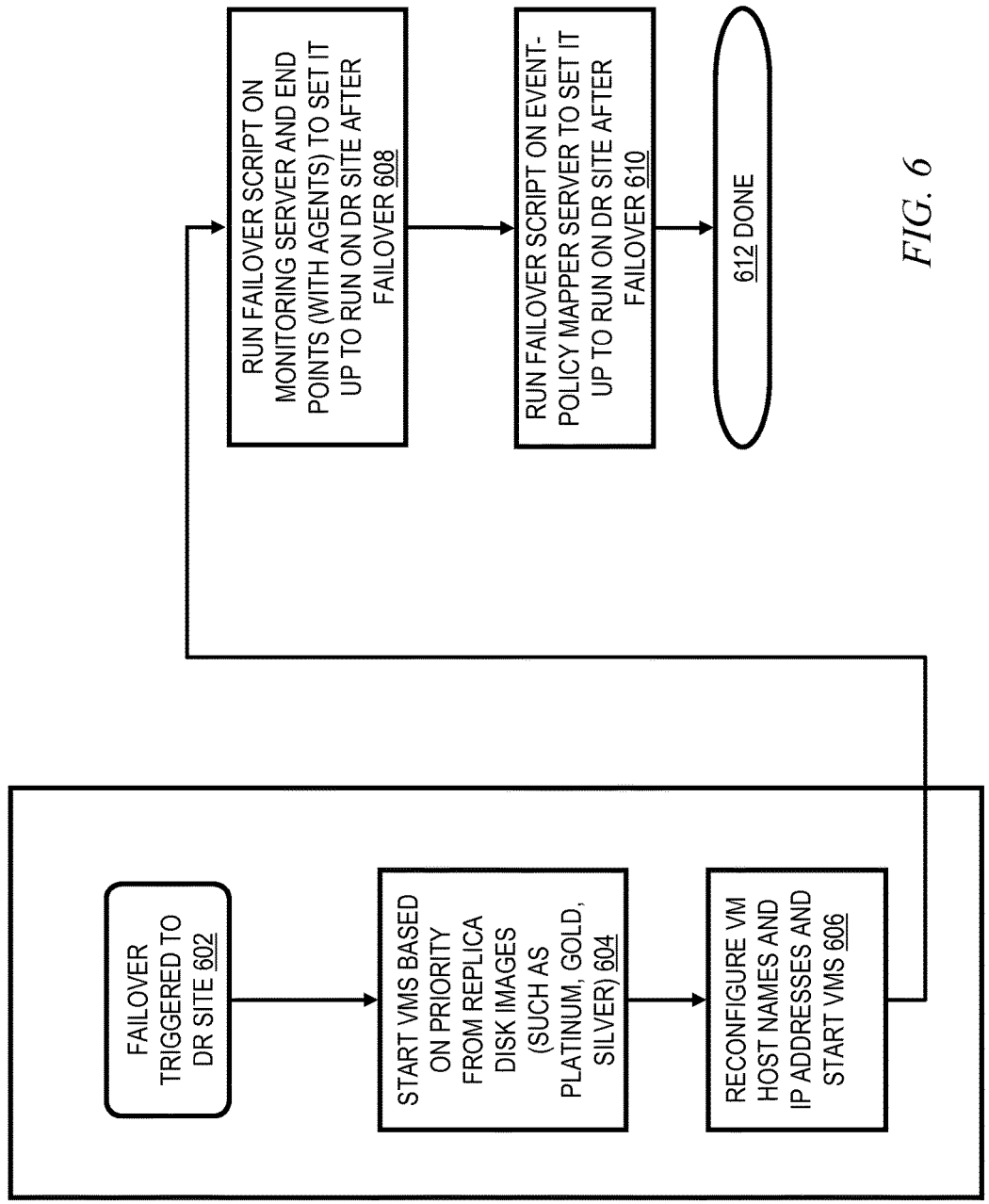
FIG. 6 is a flow chart of disaster recovery failover for monitoring, useful with self-contained metadata.
Figure 9:
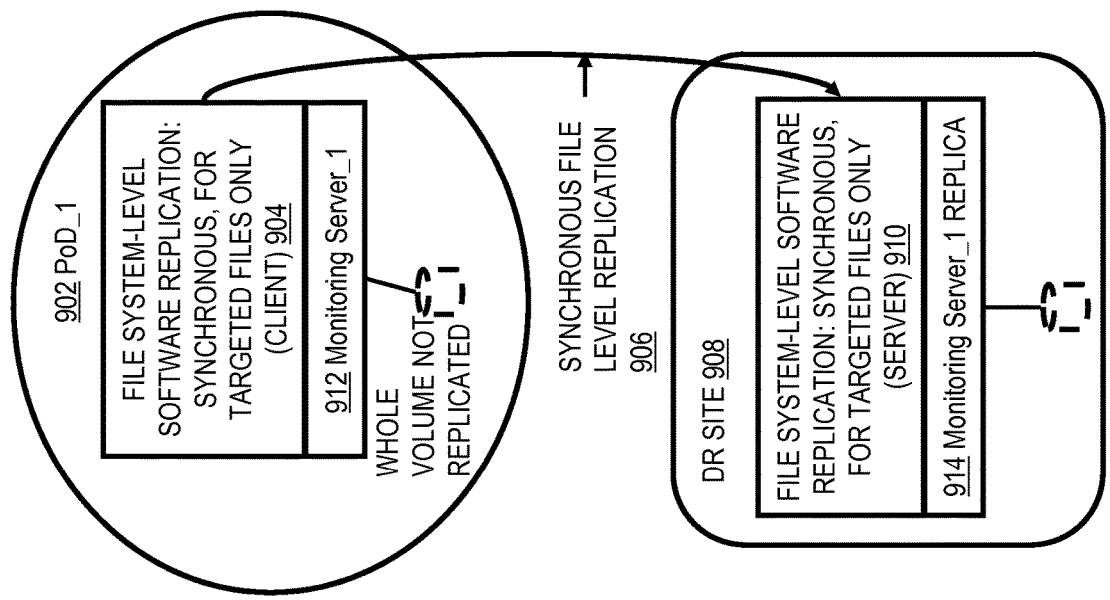
FIG. 9 depicts synchronous file level replication, useful with self-contained metadata.

The metadata is more complex where the failed-over managed service is a monitoring service. Typically, the metadata in such a case is internally represented in non-relational databases. One or more embodiments leverage application program interface(s) (API(s)) provided by the monitoring services. An agent is installed on the VM to be monitored, together with appropriate rules. When provisioning the VM, it is set up for monitoring. It is worth noting that IBM TIVOLI MONITORING software available form International Business Machines Corporation, Armonk, N.Y., USA, is one non-limiting example of software that could be run on servers 416, 420, 912, 424, 430, 914 (FIG. 9 is discussed elsewhere herein). This TIVOLI software has commands that can be used to set a VM up for monitoring. Note that elements 414, 418, 438, 428 are customer virtual machines but they do not necessarily have to be virtual; they could be physical in some circumstances. FIG. 6 is a flow chart of disaster recovery failover for monitoring. In step 602, failover to the DR site 406 is triggered. In step 604, start VMs in DR site 406 based on priorities from replica disk images (e.g., "Platinum," "Gold," "Silver"). In step 606, reconfigure the VM host names and IP addresses and start the VMs in DR site 406. Steps 602, 604, and 606 are analogous to those known from the prior art. In step 608, run a failover script on monitoring server 420 and customer VM (with agents) to set the monitoring server replica 430 up to run on DR site 406 after failover. FIG. 6 shows the steps in a typical chronological order. Non-limiting exemplary details of step 608 are given in FIG. 7. In step 610, run a failover script on Event-Policy Mapper server 422 to set the Event-Policy Mapper server replica 432 up to run on DR site 406 after failover. Non-limiting exemplary details of step 610 are given in FIG. 8. Processing ends at 612.

Furthermore in this regard, in one or more embodiments, each of the servers 416, 408, 420, 422, 424, 426, 430, and 432 is provided with a failover script and a failback script. The scripts can be written, for example, in Perl, Java, or any other suitable current programming language. Furthermore, each VM (or physical machine) monitored by each monitoring server is provided with an agent. Refer to servers 414, 418, 438, 428. The agents are registered on machines 416, 420, 424, 430 respectively. Additionally, the agents installed on machines 414, 418, 438, 428 report the collected metrics to the monitoring servers 416, 420, 424, 430, respectively. Steps 608, 610 are repeated for each managed service.

Figure 7:
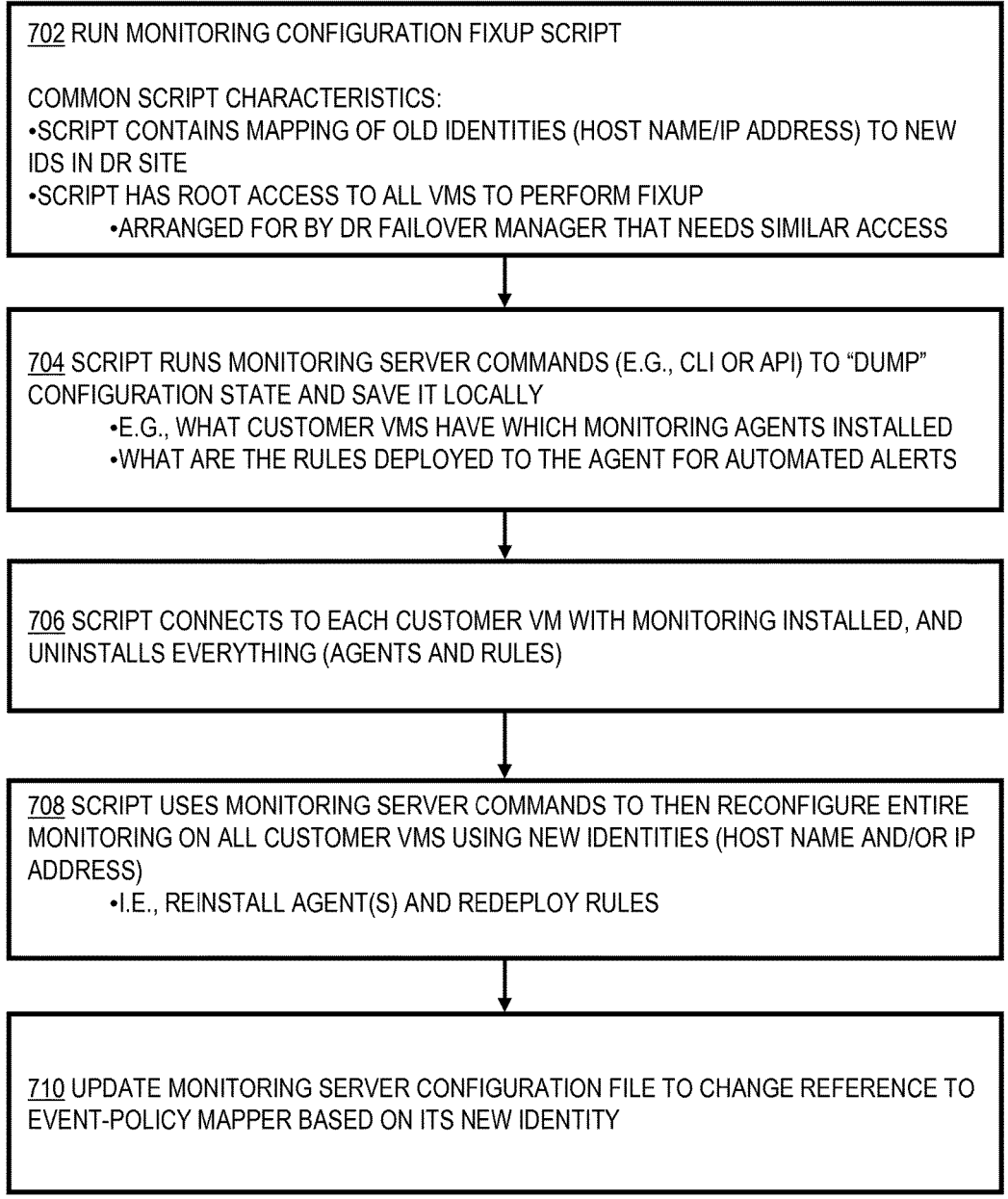
FIG. 7 is a detailed flow chart of one possible manner of carrying out step 608 in FIG. 6, useful with self-contained metadata.

FIG. 7 is a detailed flow chart of one possible manner of carrying out step 608 in FIG. 6. In a non-limiting exemplary embodiment, at 702, run a monitoring configuration fix-up script on server 430. The script typically has certain common script characteristics; for example, the script contains a mapping of old identities (host name and/or IP address in site 404) to new IDs in DR site 406; the script has root access to all VMs to perform fix-up; and this is arranged for by DR failover manager 410, which needs similar access. At 704, the script runs monitoring server commands (e.g., command line interface (CLI) or API) to "dump" configuration state and save it locally in 424 (e.g., what customer VMs have which monitoring agents installed and/or what rules are deployed to the agent for automated alerts). At 706, the script connects to each customer VM 428 with monitoring installed, and uninstalls existing agents and rules. In step 708, the script uses monitoring server commands to then reconfigure the entire monitoring on all customer VMs using new identities (host name and/or IP address); i.e., to reinstall agent(s) and redeploy rules. This can optionally be done in a batch process. In step 710, update the monitoring server configuration file to change reference to the Event-Policy Mapper 422 based on its new identity 432. In one or more embodiments, appropriate scripts and/or agents run in site 406 after a disaster has occurred).

FIG. 8 is a detailed flow chart of one possible manner of carrying out step 610 in FIG. 6. In step 802, run an event-policy mapper configuration fix-up (failover) script on server 432. Servers 408, 422 typically have limited metadata, but do have a list (database or DB) of events wherein the sources (e.g., VMs) are identified by the old addresses in site 404. In one or more embodiments, common script assumption apply; for example, assume no "wiring" of the Event-Policy Mapper to any other MS instance (e.g., ticketing). In step 804, the event DB entries contain old identities of event sources (e.g., VMs). The simplest "fix-up" approach is typically to remove all event entries with such old identities. A more complex "fix-up" approach is to update each event DB entry to replace the old identity (host name and/or IP address) with the new identity.

Consider the case of failback for monitoring, referring again to FIG. 5. Heretofore, in current systems, for each customer VM, the logical units (LUs) of the VM disks are replicated from the DR site to the "n$^{th}$" PoD "PoD_n." Once synch-up is nearly complete, the managed VM is taken to a quiescent state, final synch-up is completed, and the customer VM in PoD_n is started. In some instances, this latter step might have to be delayed.

In one or more embodiments of the invention, which utilize a monitoring server and policy mapper, delay the step of starting the customer VM 418 in PoD_n 404 for managed VMs. For the monitoring server VM, reverse merge the config (configuration file) of the DR site's monitoring server 430 to the PoD_n monitoring server config replica 420. Reverse merge of configurations into the monitoring server is typically only done for the customer system groups corresponding to PoD_n managed VMs. During the configuration merge, it may be the case that new rules were defined and/or some rules were deleted or modified in the DR site 406. The original IP address for each record is still valid; no change is required. Replicate the LU of the PoD_n monitoring server to PoD_n. In one or more embodiments, IP address fix-ups are not required because the monitoring server has the old IP address that is valid in the primary site 404.

The steps just described are repeated for the policy mapper VM 432 being failed back to the replicated machine 422.

The customer VMs are started in PoD_n 404. Management of these VMs is then commenced. Note that reversing the starting and managing for these VMs could potentially lead to complexity in managing systems. For example, the new rules that were added while PoD_n in 406 will not be evaluated, deleted rules that were removed while in PoD_n in 406 will continue to be evaluated or rules that were modified in PoD_n in 406 will evaluate incorrectly.

FIG. 9 depicts synchronous file level replication. In one or more embodiments, storage system volumes are dedicated to VMs. However, VMware VMFS is a counter-example to this case. VMware VMFS (Virtual Machine File System) is a cluster file system available from VMware, Inc. of Palo Alto, Calif., USA. Other embodiments can be adopted for use with VMware VMFS and similar systems. For example, mount the VMFS file in loopback mount mode. With asynchronous replication, the contents of the master (Monitoring Server_1 912 in PoD_1 902) are not up to date with the DR replica (Monitoring Server_1 replica 914 in DR site 908), as indicated by the notation "whole volume not replicated." The lag determines RPO. If the monitoring and/or policy server configuration is updated, DR site 908 will not "see" this for some predetermined time period; say, "X" seconds. If a PoD disaster occurs between configuration update and replica update, the DR site will not restart with the latest PoD configuration. One possible approach is to employ limited synchronous replication 906.

The skilled artisan will appreciate that different management services will have different types of metadata. In the case of monitoring and event management, monitoring metadata typically includes rules to determine when metrics from an entity indicate incidents (events), while event management metadata includes customer specific policies regarding automated ticket handling (ticketing system, support group, severity, etc.) in response to incidents (events). In the case of patch management, metadata includes the entity to be patched, current patch level, patch priority and schedule, and the like. In the case of firewalls, metadata includes allowing/disallowing inbound/outbound traffic to/from specific networking endpoints (IP addresses and ports).

FIG. 10 shows non-limiting exemplary meta-data; in particular, monitoring meta-data 1002, first event management meta-data 1004; and second event management meta-data 1006. Post-disaster recovery fix-up of monitoring meta-data is shown at 1008. Post-disaster recovery fix-up of event management meta-data 1004 is shown at 1010.

The skilled artisan will appreciate that many other cases can be handled by the self-contained meta-data approach in addition to the non-limiting exemplary embodiment. For example, consider a virtual load balancing firewall running in a fully-managed, highly secure IaaS cloud such as IBM Cloud Managed Services (formerly known as IBM SMART CLOUD ENTERPRISE PLUS) available from International Business Machines Corporation, Armonk, N.Y., USA. Consider such a load balancing firewall running on a VM, one per customer. In a non-limiting exemplary embodiment, each entry is of the following form:

Key=Source IP address/subnet, Dest. IP addr./subnet, destination port, protocol

Value=allow/disallow (access)

After DR, typically, only a subset of the entries will be relevant and the destination as well as the source internet protocol (IP) addresses will need fix-up. For example, the managing systems could be the source.

Distributed Metadata

One or more embodiments provide techniques to preserve management services with distributed metadata through the disaster recovery life cycle. One or more embodiments extend the techniques described above for self-contained metadata, to address management services with more complex metadata. In one or more embodiments, the metadata is not isolated within the management service. For example, parts of the metadata required for operation of the service may be stored in the infrastructure layer, to which the management service has no access. Or, the failover site where customer applications run after a disaster may use an alternate instance of the management service, which has to be ceded control. One or more embodiments are able to handle that constraint for management service preservation (e.g., virtual machine (VM) provisioning service). Furthermore, parts of the metadata may be stored in customer virtual servers; this extends the scope and complexity of the process of management service preservation. Non-limiting examples include High Availability service, e.g., Tivoli Systems Automation (TSA), High Availability Clustered Management Program (HACMP), Microsoft Cluster Services (MSCS), and the like.

One or more embodiments are, as noted above, applicable to physical and/or virtual machines, and to cloud and/or non-cloud environments.

Heretofore, disaster recovery (DR) has primarily covered state maintenance of servers and applications such as storage for servers and applications. From the cloud perspective, these servers and applications are managed entities. One or more embodiments extend DR to the state maintenance of the managing entities, even where the metadata is not isolated within the management service.

Consider "Normal," provisioning, and high availability (HA) managed service metadata preservation. Many managed services run, as one or more VMs, independently of customer VMs, and can be handled by the "self-contained" embodiments set forth above. Metadata and state are local to the managed service. Operations to enable failover after PoD failure and failback once PoD is operational include:

1. Steady state: Continuous (possibly asynchronous) replication of PoD-MS state to DR site
2. Failover: Extraction of state from MS replica, and subset+merge with DR-MS instance
3. Failback: Optional merge of DR-MS instance state with PoD-MS state in replica
4. Failback: Optional replication of DR-site replica to PoD if PoD-MS state updated in item 3.

One or more embodiments herein are directed to cases with distributed metadata. Consider, for example, a provisioning service. Provisioning raises an interesting complication: if provisioning is allowed in the DR site after failover, then provisioning actions have to be repeated in the primary site after failback. Placement decisions (e.g., which hypervisor to run a VM on) made by the DR site PS (provisioning service) 1129 in FIG. 11 will not make sense in the primary site. In the failover site, metadata about how a VM and its dependent resources are allocated is distributed across the DR site PS, and inside hypervisors, network switches/bridges and storage systems. Furthermore, resource constraints in the DR site are not identical to the primary site.

Consider the non-limiting example of HA Clusters. For application clusters created with TSA-like tools, part of the metadata is in the customer VMs, since global cluster state is maintained by sharing local state across cluster nodes using distributed systems protocols resilient to node and network failures.

Figure 11:
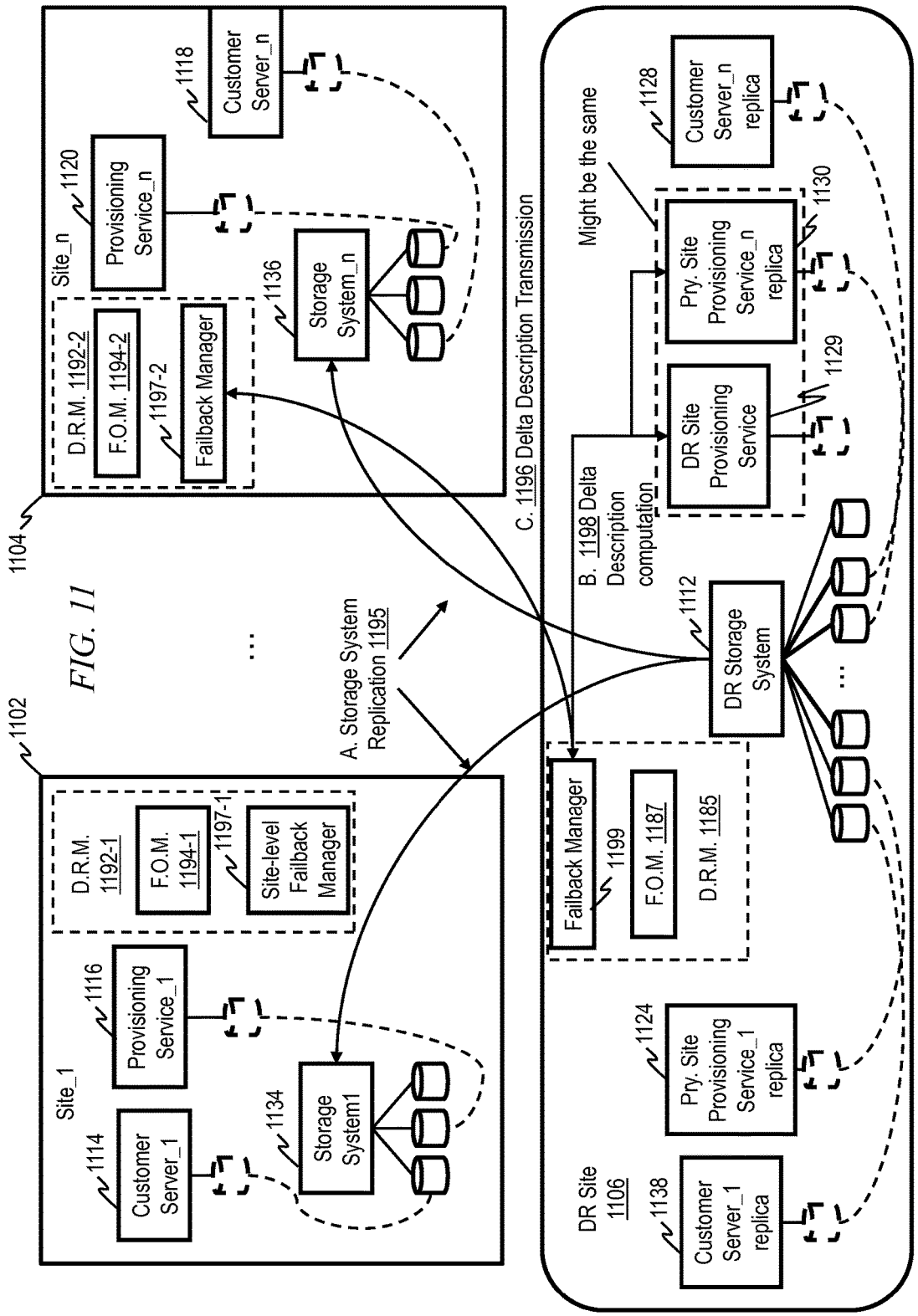
FIG. 11 depicts an exemplary disaster recovery and provisioning scenario with storage replication, in a failback mode, useful with distributed metadata, in accordance with an aspect of the invention.

Attention should now be given to FIG. 11, which depicts an exemplary disaster recovery and provisioning scenario with storage replication, in a failback mode, useful with distributed metadata, in accordance with an aspect of the invention. Note two sites 1102, 1104 where customer workloads have been running—these can be cloud or non-cloud sites, and there can be any number of sites, as indicated by the ellipsis. Replicas of server storage units (disk drives or volumes) made during normal operation, prior to failure, reside at disaster recovery (DR) site 1106.

More particularly, first site 1102, also designated as Site_1, includes Customer Server_1, designated as 1114 and Provisioning Service_1, designated as 1116, and coupled to Storage System1, designated as 1134. Also included is a site-level disaster recovery manager 1192-1 including a site-level failover manager 1194-1 and a site-level failback manager 1197-1. Furthermore, $n^{th}$ site 1104, also designated as Site_n, includes Customer Server_n, designated as 1118, and Provisioning Service_n, designated as 1120, and coupled to Storage System_n, designated as 1136. Also included is a site-level disaster recovery manager 1192-2 including a site-level failover manager 1194-2 and a site-level failback manager 1197-2. The provisioning services create new VMs, modify VM properties, add memory, and so on.

Disaster recovery (DR) site 1106 includes Customer Server_1 replica, designated as 1138, and Primary site Provisioning Service_1 replica designated as 1124, all coupled to the DR storage system, designated as 1112. Furthermore, DR site 1106 further includes Customer Server_n replica, designated as 1128, DR site provisioning service 1129, and Primary (abbreviated herein as "Pry") site Provisioning Service_n replica, designated as 1130, also all coupled to the DR storage system 1112. Finally, DR site 1106 includes disaster recovery manager 1185 including failover manager 1187 and DR Failback manager 1199 which orchestrates the failback process. Elements 1129, 1130 may or may not be the same.

Consider now provisioning preservation after failover and failback. In particular, consider preservation of VM provisioning management after failover and failback. One significant challenge is failback handling. State changes in the DR site 1106 caused by provisioning operations have to be replicated back in the primary site 1104 after failback. In this aspect, provisioning metadata fix-up is not a case of simple mapping (e.g., virtual machine ID) as in the above discussion of the self-contained metadata case. Provisioning operations in DR site 1106 may not be replicable in the primary site 1104 after failback (due to resource limitations). One possible solution to complete handling of the resource-limit issue includes transmission of "primary site capacity" information to the DR site to control provisioning operations after failover.

In one or more embodiments, the following functions in the DR site require provisioning state tracking after disaster and prior to failback:
1. Provision new VM
2. Delete VM
3. Modify VM (e.g., add/remove disk, add/remove CPU, add RAM, etc.)
4. Network configuration changes resulting in firewall updates—as a result of new VM provisioning or updates, do not have to be explicitly tracked. But new security zones (VLANs) associated with VMs have to be tracked.

Figure 12:
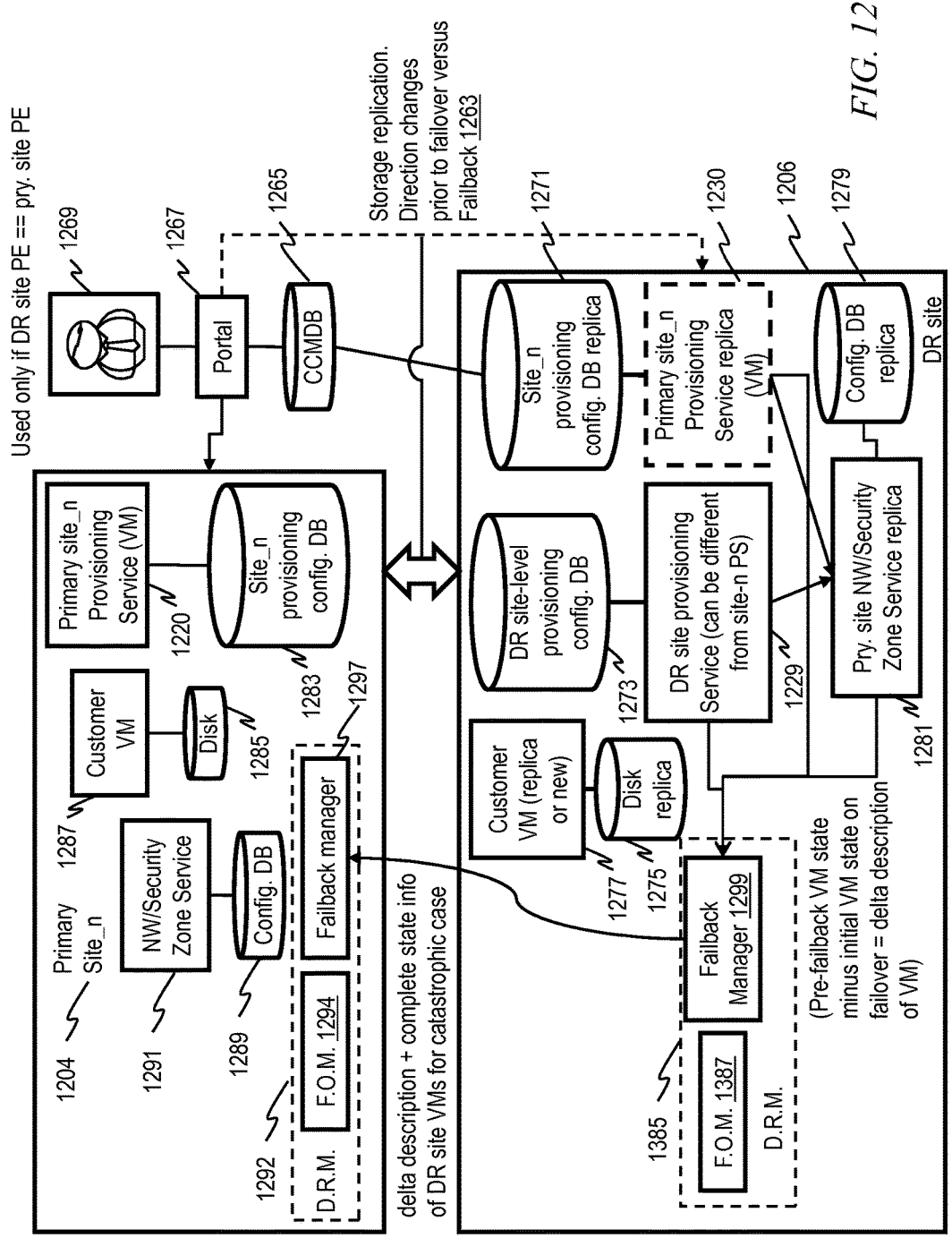
FIG. 12 depicts preservation of virtual machine provisioning management, useful with distributed metadata, in accordance with an aspect of the invention.

Still considering preservation of VM provisioning management service and referring now also to FIG. 12, consider actions to be taken upon DR set-up. Initially, replica VMs are set up (replicas of VMs in primary site 1204). Element 1277 represents a replica VM (e.g., replica of VM 1287) and/or a new VM created by the provisioning service 1229 in the DR site 1206. The provisioning service in the DR site might be a different system than the one used in the primary site—because the DR capability provider cannot necessarily replicate provisioning tools used by different customers in different primary sites, in the general case of one or more embodiments that do not require all primary sites and management services on those sites to be under the control of a single (Cloud or physical infrastructure) provider. Note the primary site provisioning service 1220 with its associated provisioning configuration database 1283. Note also the corresponding replicas in the DR site 1206; namely, 1271 and 1230. Furthermore, note that the DR site has its own provisioning service 1229 and associated configuration database 1273. As noted, provisioning service 1229 can be the same as, or different from 1230. Still considering actions to be taken upon DR set-up (i.e., before a disaster occurs); in particular, for each primary VM to be DR-protected, replica VMs are created, their storage is allocated, the replica VMs are quiesced, and storage replication is started at the logical unit (LU) or volume level.

Note also primary site NW/Security Zone service 1291 and its configuration database 1289, with corresponding replicas 1281, 1279. Portal 1267 provides a user interface for customer 1269 to request VM provisioning services in the primary site. It can also be employed in the DR site if the same provisioning service is also used in the DR site to provision new VMs or modify and delete existing VMs after failover. As indicated by the double-ended block arrow 1263, prior to failover, storage is replicated from the primary site to the DR site; while before failback, storage is replicated from the DR site to the primary site.

Now considering actions to be taken upon DR set-up; replica VMs are created when the DR is set up using the PS 1220 used in the primary site (e.g., any suitable provisioning engine such as OpenStack, IBM Tivoli® Service Automation Manager (TSAM) (registered mark of International Business Machines Corporation, Armonk, N.Y., USA), etc.).

Now consider actions taken by the replica site Failover Manager 1387 after failover. In one or more embodiments, an initial snapshot records which primary site VMs are in the DR site, and which are not. This information is in the Failover Manager 1387. This aspect in and of itself can be carried out using known techniques. A detailed initial DR site provisioning state of each VM is already available in the Failover Manager's local DB. This includes the number of CPUs, memory size, IP address(es), security zone and other resource descriptions. This is stored locally by the DR Site Failover Manager 1387. The remaining capacity information in the primary site is extracted from the primary site's Provisioning Service's (PS) config DB replica 1271 via PS application program interfaces (APIs) (even if the primary site PS is not used in the DR site). This information can be used to restrict provisioning operations in the DR site, to reduce (but not eliminate) the chance of provisioning adjustments failing in the primary site after failback. Note that the Failover Manager 1387 handles operations required to transition customer workloads to the DR site after a disaster (e.g., a hurricane floods the data center) or planned failover (for data center maintenance). The Failback Manager 1297, 1299 does the reverse—it orchestrates the actions required to transition the customer workloads back to the primary site after it has been made operational again (e.g., data center repaired, flood waters drained, power and cooling restored, etc.). The focus in FIGS. 11 and 12 is on what happens after failover, up to failback to the primary site (a customer typically cannot run the customer's business in the DR site indefinitely).

Exemplary failback preparation steps will now be described. Failback from the DR site to the primary site, when the latter is operational again, is controlled by the Failback Manager (FM), whose function is split into a DR site component 1299, and a primary site component 1297, both of which cooperate to orchestrate the failback operations. One pertinent aspect in one or more embodiments is delta description computation. The FM 1299 communicates with the DR site PS 1229 and computes the current provisioning state for each replica VM for site_n, and also computes the "delta description" for that VM. The FM 1299 should also compute changes in the security zone, etc., as part of the delta description. Delta description computation for Site_n is shown at 1198 in FIG. 11.

Now consider exemplary actions on failback. In the case of a non-catastrophic disaster, e.g., electrical blackout or mild to moderate flood where the primary site will be operable again, after failback all primary site VMs are restored. Non-DR-enabled VMs are restored to their pre-disaster states that were committed to persistent storage in the primary site (1136 for Site_n in FIG. 11). On the other hand, DR-enabled primary VMs have to be restored to their replicated state. This involves:
1. First, performing persistent storage volume replication from the DR site to the primary site to restore the contents of all replicated VM disks 1275 (see 1195 in FIG. 11).
2. Next, VM modification operations are performed in the primary site using the delta description (see 1196 in FIG. 11), to bring the memory, CPU, and other resources of the primary VM(s) 1287 in synch with that of the DR site 1277 (Delta descriptions and execution steps in the primary site FM 1297 on failback are discussed below).

Furthermore, new VMs 1277 created in the DR site 1206 after failover are recreated in the primary site 1204 using the delta description. Replicated VMs deleted in the DR site are also deleted in the primary site using the delta description.

For a catastrophic disaster (primary site destroyed), after failback, there are no primary site VMs to restore, since all the persistent storage 1136 backing up VM disks (e.g., 1285) is destroyed. Each VM in the DR site is (newly) provisioned in the (rebuilt) primary site using the Initial DR site VM state+the delta description for that VM. The disk state is then completely replicated from the DR site to the primary site.

Consider now delta descriptions and execution steps in the primary site FM 1297 on failback. For a catastrophic disaster, all DR site VMs are recreated on the primary site and their disks replicated—the equivalent of DR setup in the reverse direction. For a non-catastrophic disaster, VMs newly created on the DR site are created on the primary site after failover. Primary VM replicas deleted in the DR site are deleted on the primary site after failover. The table of FIG. 13 is applicable for the non-catastrophic DR scenario, for primary VMs modified after failover.

In particular, the table of FIG. 13 shows, in the first column, various delta descriptions (final resource state of primary VM replica in DR site just prior to failback less initial resource state of primary VM replica in DR site); in the second column, corresponding provisioning operation(s) on the primary VM during failback; and in the third column, pertinent notes (if any). When the delta description indicates that memory was added or removed, memory is added to or deleted from the primary VM on failback, as the case may be. When the delta description indicates that one or more CPUs were added or deleted, CPUs are added to or deleted from the primary VM on failback, as the case may be. When the delta description indicates that one or more IP addresses were added or deleted, IP addresses are added to or deleted from the primary VM on failback, as the case may be.

When the delta description indicates that a disk was added or deleted, a disk is added to or removed from the primary VM on failback, as the case may be. For each disk added in the DR site, create a new disk of the same size in the primary VM and replicate the primary VM disk contents from the DR site LU (logical unit). DR site file system changes will be reflected in the reverse replica of that volume to the primary site. For each disk deleted in the DR site, delete the disk in primary VM. File system mount point changes are recorded in the replica of the boot volume. When the delta description indicates that disk size was increased, the primary VM's disk size is increased during failback. In one or more embodiments, this involves a workflow. For example, first, increase disk size in primary VM; second, reverse replicate disk content from DR site. DR site file system changes will be reflected in reverse replica of the volume to the primary site. When the delta description indicates that a security zone was added or deleted, a security zone is added or deleted in the primary site during failback, as the case may be. In one or more embodiments, this results in underlying firewall and/or VLAN changes.

Configuration change management database 1265 is provided in one or more embodiments and is accessed by user 1269 via portal 1267. In one or more embodiments, it is coupled to configuration database replica 1271.

Note also that one or more embodiments include primary site disaster recovery manager 1292, with primary site failover manager 1294 and primary site failback manager 1297, analogous to elements 1192, 1194, 1197 in FIG. 11; as well as disaster recovery site disaster recovery manager 1385, with disaster recovery site failover manager 1387 and disaster recovery site failback manager 1299, analogous to elements 1185, 1187, 1199 in FIG. 11.

Recapitulation Regarding Distributed Metadata

Given the discussion thus far, it will be appreciated that, in general terms, an exemplary method, according to an aspect of the invention, includes the step of, during normal operation, at a first site 1104, 1204, of a disaster recovery management unit including at least one customer workload machine (e.g., 1118) and at least one management service machine (e.g., 1120) implementing at least one management service, replicating to a remote disaster recovery site 1106, 1206 the at least one customer workload machine, the at least one management service machine, and metadata for the at least one management service. At least a portion of the metadata is not isolated within the at least one management service. A suitable DR Manager 1192/1185 or 1292/1385 e.g. can be used to set up the storage system replication when DR service is requested by the customer, while a suitable Failover Manager 1194/1187 or 1294/1387 e.g. can be used to orchestrate the transfer of operations (customer workloads) from the primary to the DR site during failover, due to a catastrophic or non-catastrophic disaster. Given the teachings herein, the skilled artisan will be able to employ known DR Managers and known Failover Managers to carry out this step. Further steps include, after a disaster at the first site, initiating a failover process. The failover process includes bringing up, at the remote disaster recovery site, a replicated version of the at least one customer workload machine (e.g., 1128); bringing up, at the remote disaster recovery site, a replicated version of the at least one management service machine (e.g., 1130); operating, at the remote disaster recovery site, the replicated version of the at least one customer workload machine and the replicated version of the at least one management service machine, in accordance with the metadata for the at least one management service; and creating an initial snapshot of a distributed metadata state of the metadata for the at least one management service implemented on the replicated version of the at least one management service machine. The process of bringing up the replicas and operating the DR site can be orchestrated by the Failover Manager. The initial snapshot can be created by the Failover Manager and/or the Failback Manager.

Furthermore in this regard, in one or more embodiments, right after the disaster, the Failover Manager and/or the Failback Manager takes a checkpoint (i.e., creates an initial state description of every managed service with distributed metadata to determine what the state is right after the disaster). This is useful since, before failback, the delta description is to be calculated and the delta description is the difference between the state just before failback and the state just after failover. Accordingly, a snapshot is taken of the distributed metadata state of every managed service with distributed metadata so that the delta description can be computed during failback.

Furthermore, subsequent to initiating the failover process, a failback process is initiated. The failback process includes creating a representation of state changes for the at least one management service implemented on the replicated version of the at least one management service machine made in the remote disaster recovery site since the failover process and calculating therefrom a delta description from the initial snapshot. See 1198 in FIG. 11, e.g. In at least some embodiments, this step is carried out by the replica site failback manager interacting with the replica managed service and related components. The failback process further includes transmitting the delta description of the managed service state changes to the first site (for example, the replica site failback manager transmits the delta description of the managed service state changes to the first site failback manager (see 1196 in FIG. 11, e.g.)). The failback process still further includes creating a reverse replica (e.g., host based or storage system based) of all the workload components from the remote disaster recovery site at the first site and playing back the delta description to restore a distributed metadata state that existed in the remote disaster recovery site and re-create it in the first site. For example, the primary site failback manager may create the reverse replica and play back the delta description received from the replica site failback manager to restore the distributed metadata state.

In one or more embodiments, the Failback Manager 1197-1 or 1197-2 and 1199 orchestrates the transfer of operations from the DR site to the primary site when it is restored, either to its pre-disaster state for a non-catastrophic disaster, or to a "bare metal" state after a catastrophic disaster. Special logic is employed in the Failback Manager when management services are protected by DR and are failed back, and the management services have distributed metadata, not limited to being stored in the Management Service node(s) only.

It will be appreciated that, in general, the disaster recovery management unit can be located within a cloud environment or a non-cloud environment. Furthermore, the at least one customer workload machine and the at least one management service machine can be non-virtualized physical machines or virtual machines executing on one or more physical machines under control of a hypervisor. Indeed, one or more embodiments can be applied to physical machines, where the provision service creates, modifies, and deletes physical machines instead of virtual machines. One or more embodiments apply in that case as well, since the machines in the replica (DR) site may not be identical to those in the primary site, and also the resource pool in the two sites may not be identical. However, some operations such as add/delete CPU are not automated provisioning operations on physical machines, so some of the descriptions of provisioning operations and associated delta description are not applicable to a non-virtualized scenario.

Furthermore, it should again be pointed out that one or more embodiments are generally applicable to preserving management services with distributed metadata through the disaster recovery life cycle, and are not limited to provisioning; provisioning scenarios are set forth herein as non-limiting exemplary embodiments.

In some instances, the at least one management service includes a provisioning service, and a further step includes, subsequent to the step of operating the replicated version of the at least one customer workload machine and the replicated version of the at least one management service machine in accordance with the metadata for the at least one management service, carrying out and tracking additional provisioning at the remote disaster recovery site (e.g., with 1129, 1229). Note that one or more embodiments track the additional provisioning not by tracking each provisioning operation, but rather by only tracking the differences, as discussed below. An even further step includes, subsequent to the additional provisioning, upon the first site coming back up, restoring the first site to reflect the tracked additional provisioning (e.g., via cooperation between 1199 and 1197-2). Such additional provisioning can include, by way of example and not limitation, provisioning a new virtual machine, deleting an existing virtual machine, modifying an existing virtual machine, and/or establishing at least one new security zone associated with an existing virtual machine.

In some instances, the replicating to the remote disaster recovery site includes host-based replication; the provisioning service includes a primary site provisioning service 1120 used at the first site 1104; and the carrying out and tracking of the additional provisioning at the remote disaster recovery site is carried out with a remote disaster recovery site provisioning service 1129 different than the primary site provisioning service. The skilled artisan will appreciate that host-based replication is a form of replication where software running on each server/machine (virtual or physical) controls replications of the disks of that server alone to a remote replica site. Host-based replication per se is known to the skilled artisan, who, given the teachings herein, will be able to adapt one or more known host-based replication techniques to implement one or more embodiments.

On the other hand, in some cases, the replicating to the remote disaster recovery site includes storage-based replication; the provisioning service includes a primary site provisioning service 1120 used at the first site 1104; and the carrying out and tracking of the additional provisioning at the remote disaster recovery site is carried out with the replicated version 1130 of the at least one management service machine (1129=1130). It will be appreciated that the choice of replication technology—host-based or storage-based, is orthogonal to the condition of whether the provisioning service in the replica site is the same as or different from the provisioning service in the primary site.

Referring again to FIG. 12, in some cases, a further step includes, subsequent to the additional provisioning and prior to restoring the first site 1204 to reflect the tracked additional provisioning, calculating for each virtual machine 1277 in the remote disaster recovery site a delta description including a pre-failback state of a given one of the virtual machines less an initial state of the given one of the virtual machines on failover. The delta description in essence captures the differences in the state for each VM between the post-failover state and the pre-failback state. It is different from a log of all state changes that are made to a VM. E.g., a VM with a post-failover state=2 GB of RAM, whose memory size is increased 3 times by 2 GB, represents a single entry in the delta description: memory increase by 6 GB.

In some such cases, the disaster is a catastrophic disaster, and the restoring of the first site to reflect the tracked additional provisioning includes newly provisioning each of the virtual machines 1277 in the remote disaster recovery site into the first site in accordance with an initial remote disaster recovery site virtual machine state for each of the virtual machines in the remote disaster recovery site modified by a corresponding one of the delta descriptions. This is followed by replication of the contents of each disk of that VM from the replica site to the primary site.

On the other hand, in some such cases, the disaster is a non-catastrophic disaster, and the restoring of the first site to reflect the tracked additional provisioning includes a number of sub-steps, as appropriate. Non-replicated virtual machines from the first site (i.e., VMs in primary site that were not replicated to the DR site) are restored to a pre-disaster state from persistent storage (e.g., 1136) in the first site. (Note as an aside that element 1285 is a virtual disk of a virtual machine; physical storage backing up such virtual disks is the storage system in the primary site, e.g., 1136.) Consider those of the virtual machines 1277 in the remote disaster recovery site that are undeleted replicated virtual machines (i.e., VMs from the primary site that were replicated to the DR site and were not subsequently deleted). These are replicated back into the first site by carrying out persistent storage volume replication from the remote disaster recovery site to the first site and modifying the restored virtual machines at the first site in accordance with corresponding ones of the delta descriptions. Consider also those of the virtual machines 1277 in the remote disaster recovery site that are newly-created virtual machines (i.e., VMs newly created in the DR site after failover). These are replicated into the first site by recreating them in the first site in accordance with corresponding ones of the delta descriptions. Finally, consider those of the virtual machines in the remote disaster recovery site that are deleted replicated virtual machines (i.e., VMs from the primary site that were replicated to the DR site and were subsequently deleted). The corresponding VMs in the first site are simply deleted.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in the figures; e.g., disaster recovery manager with components at primary site and disaster recovery site; failover manager with components at primary site and disaster recovery site; failback manager with components at primary site and disaster recovery site. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

during normal operation, at a first site, of a disaster recovery management unit comprising at least one customer workload machine and at least one management service machine implementing at least one management service, replicating to a remote disaster recovery site said at least one customer workload machine, said at least one management service machine, and metadata for said at least one management service implemented on said at least one management service machine, at least a portion of said metadata not being isolated within said at least one management service;

after a disaster at said first site, initiating a failover process comprising:

bringing up, at said remote disaster recovery site, a replicated version of said at least one customer workload machine;

bringing up, at said remote disaster recovery site, a replicated version of said at least one management service machine;

operating, at said remote disaster recovery site, said replicated version of said at least one customer workload machine and said replicated version of said at least one management service machine, in accordance with said metadata for said at least one management service implemented on said at least one management service machine; and creating an initial snapshot of a distributed metadata state of said metadata for said at least one management service implemented on said replicated version of said at least one management service machine, wherein said distributed metadata is distributed across at least two of a provisioning service, a customer virtual machine, a hypervisor, a network switch or bridge, a storage system, and said replicated version of said at least one management service machine;

subsequent to initiating said failover process, initiating a failback process comprising:

creating a representation of state changes for said at least one management service implemented on said replicated version of said at least one management service machine made in said remote disaster recovery site since said failover process and calculating therefrom a delta description from said initial snapshot;

transmitting said delta description to said first site; and creating a reverse replica of all the workload components from the remote disaster recovery site at the first site and playing back the delta description to restore a distributed metadata state that existed in the remote disaster recovery site and re-create it in the first site, wherein said at least one management service comprises a provisioning service, said method further comprising:

subsequent to said step of operating said replicated version of said at least one customer workload machine and said replicated version of said at least one management service machine in accordance with said metadata for said at least one management service, carrying out and tracking additional provisioning at said remote disaster recovery site; and subsequent to said additional provisioning, upon said first site coming back up, restoring said first site to reflect said tracked additional provisioning.

2. The method of claim 1, wherein:

said step of replicating to said remote disaster recovery site is carried out by a disaster recovery manager module executing on at least one hardware processor;

said steps of bringing up said replicated versions of said at least one customer workload machine and said at least one management service machine are carried out by a failover manager module executing on said at least one hardware processor;

said steps of creating said representation of said state changes, transmitting said delta description, and creating said reverse replica are carried out by a failback manager module executing on said at least one hardware processor; and said step of creating said initial snapshot is carried out by at least one of said failover manager module and said failback manager module executing on said at least one hardware processor.

3. The method of claim 1, wherein said additional provisioning comprises provisioning a new virtual machine.

4. The method of claim 1, wherein said additional provisioning comprises deleting an existing virtual machine.

5. The method of claim 1, wherein said additional provisioning comprises modifying an existing virtual machine.

6. The method of claim 1, wherein said additional provisioning comprises establishing at least one new security zone associated with an existing virtual machine.

7. The method of claim 1, wherein:

said replicating to said remote disaster recovery site comprises host-based replication;

said provisioning service comprises a primary site provisioning service used at said first site; and said carrying out and tracking of said additional provisioning at said remote disaster recovery site is carried out with a remote disaster recovery site provisioning service different than said primary site provisioning service.

8. The method of claim 1, wherein:

said replicating to said remote disaster recovery site comprises storage-based replication;

said provisioning service comprises a primary site provisioning service used at said first site; and said carrying out and tracking of said additional provisioning at said remote disaster recovery site is carried out with said replicated version of said at least one management service machine.

9. The method of claim 1, wherein, subsequent to said additional provisioning and prior to restoring said first site to reflect said tracked additional provisioning, said delta description is calculated for each virtual machine in said remote disaster recovery site as a pre-failback state of a given one of said virtual machines less an initial state of said given one of said virtual machines on failover.

10. The method of claim 9, wherein said disaster comprises a catastrophic disaster, and wherein said restoring of said first site to reflect said tracked additional provisioning comprises:

newly provisioning each of said virtual machines in said remote disaster recovery site into said first site in accordance with an initial remote disaster recovery site virtual machine state for each of said virtual machines in said remote disaster recovery site modified by said delta description; and replication of contents of each disk of each of said virtual machines in said remote disaster recovery site from said remote disaster recovery to said first site.

11. The method of claim 9, wherein said disaster comprises a non-catastrophic disaster, and wherein said restoring of said first site to reflect said tracked additional provisioning comprises:

restoring non-replicated virtual machines from said first site to a pre-disaster state from persistent storage in said first site;

restoring, into said first site, those of said virtual machines in said remote disaster recovery site that are undeleted replicated virtual machines, by carrying out persistent storage volume replication from said remote disaster recovery site to said first site and modifying corresponding restored virtual machines at said first site in accordance with said delta description;

restoring, into said first site, those of said virtual machines in said remote disaster recovery site that are newly-created virtual machines, by recreating, in said first site, said newly-created virtual machines, in accordance with corresponding ones of said delta descriptions; and deleting, in said first site, those first site virtual machines that correspond to those of said virtual machines in said remote disaster recovery site that are deleted replicated virtual machines.

12. A method comprising:

during normal operation, at a first site, of a disaster recovery management unit comprising at least one customer workload machine and at least one management service machine implementing at least one management service, replicating to a remote disaster recovery site said at least one customer workload machine, said at least one management service machine, and metadata for said at least one management service, at least a portion of said metadata not being isolated within said at least one management service;

after a disaster at said first site, initiating a failover process comprising:
    bringing up, at said remote disaster recovery site, a replicated version of said at least one customer workload machine;
    bringing up, at said remote disaster recovery site, a replicated version of said at least one management service machine;
    operating, at said remote disaster recovery site, said replicated version of said at least one customer workload machine and said replicated version of said at least one management service machine, in accordance with said metadata for said at least one management service;
    creating an initial snapshot of a distributed metadata state of said metadata for said at least one management service implemented on said replicated version of said at least one management service machine; and
    performing a fix-up process on said distributed metadata state for said replicated version of said at least one management service machine, responsive to differences between said initial snapshot and an actual state of said replicated version of said at least one customer workload machine;

subsequent to initiating said failover process, initiating a failback process comprising:
    creating a representation of state changes for said at least one management service implemented on said replicated version of said at least one management service machine made in said remote disaster recovery site since said failover process and calculating therefrom a delta description from said initial snapshot;
    transmitting said delta description to said first site; and
    creating a reverse replica of all the workload components from the remote disaster recovery site at the first site and playing back the delta description to restore a distributed metadata state that existed in the remote disaster recovery site and re-create it in the first site, wherein said at least one management service comprises a provisioning service, said method further comprising:

subsequent to said step of operating said replicated version of said at least one customer workload machine and said replicated version of said at least one management service machine in accordance with said metadata for said at least one management service, carrying out and tracking additional provisioning at said remote disaster recovery site; and subsequent to said additional provisioning, upon said first site coming back up, restoring said first site to reflect said tracked additional provisioning.

* * * * *